United States Patent [19]

Lund

[11] 4,161,568
[45] Jul. 17, 1979

[54] BATTERY HOLDER

[75] Inventor: John Lund, Reston, Va.

[73] Assignee: Schonstedt Instrument Company, Reston, Va.

[21] Appl. No.: 868,721

[22] Filed: Jan. 11, 1978

[51] Int. Cl.² .............................................. H01M 2/10
[52] U.S. Cl. ...................................................... 429/99
[58] Field of Search .......................................... 429/99

[56] References Cited

U.S. PATENT DOCUMENTS

| 1,887,811 | 11/1932 | Ikin | 429/99 |
| 2,377,161 | 5/1945 | Strange et al. | 429/99 |
| 3,859,140 | 1/1975 | Schmidt | 429/99 |

FOREIGN PATENT DOCUMENTS 1202363 10/1965 Fed. Rep. of Germany ............. 429/99

*Primary Examiner*—Donald L. Walton
*Attorney, Agent, or Firm*—Shapiro and Shapiro

[57] ABSTRACT

A holder for a plurality of dry cells comprises a tray having a pair of open-top compartments, each receiving a plurality of batteries arranged in series and biased into engagement with one another by a contact spring. A retainer projects over each compartment from a common side wall of the compartments and prevents certain batteries from being removed from their normal positions through the open tops of the compartments, while permitting such removal of other batteries. Sufficient lateral clearance is provided to permit the batteries to move somewhat in response to mechanical shock forces without breaking a desired electrical contact.

2 Claims, 2 Drawing Figures

BATTERY HOLDER

BACKGROUND OF THE INVENTION

This invention relates to battery holders, and more particularly to a holder for dry cell batteries that permits the batteries to move somewhat in response to mechanical shock forces without breaking a desired electrical contact.

In previous battery holders the batteries tend to lose electrical contact with one another or the battery holder when subjected to mechanical shock forces. If the batteries are gripped tightly by the holder, they may still move sufficiently in response to shock forces to break a desired electrical contact, and when the shock forces cease, the tight gripping of the batteries prevents restoration of the electrical contact. If the batteries are gripped loosely, substantial movement of the batteries may occur in response to shock forces, breaking the desired electrical contact, and the extent of movement may preclude restoration of the electrical contact.

BRIEF DESCRIPTION OF THE INVENTION

It is accordingly, a principal object of the present invention to provide an improved battery holder that avoids the foregoing problems of the prior art.

A further object of the invention is to provide an improved battery holder that permits the batteries to move slightly in response to mechanical shock forces, but not enough to prevent restoration of electrical contact even if contact is momentarily broken.

Another object of the invention is to provide an improved battery holder that permits the batteries to be easily inserted and removed.

Still another object of the invention is to provide an improved battery holder that has the foregoing attributes for two series of batteries arranged side-by-side, and yet is quite simple.

Briefly stated, a battery holder in accordance with a preferred embodiment of the invention comprises a tray having at least one generally rectangular compartment with a bottom wall, a pair of side walls, a pair of end walls and an open top, the compartment being dimensioned to receive a plurality of batteries in a series between the end walls and having contact means inside the end walls for engaging adjacent battery terminals. At least one of the contact means is spring biased to urge the batteries of the series into engagement with one another. Retainer means projects from one of the side walls laterally over one of the batteries, but not over an adjacent battery, so that one battery, but not the adjacent battery, is held against removal from its normal position in the compartment through the open top, and so that the one battery can be shifted in the compartment to the normal position of the adjacent battery for removal from the compartment after the adjacent battery has been removed.

BRIEF DESCRIPTION OF THE DRAWINGS

The foregoing and other objects of the invention will become more fully apparent upon consideration of the following detailed description of the invention taken in conjunction with the accompanying drawings, which illustrates a preferred and exemplary embodiment of the invention, and wherein.

DETAILED DESCRIPTION OF THE INVENTION

Figure 1:
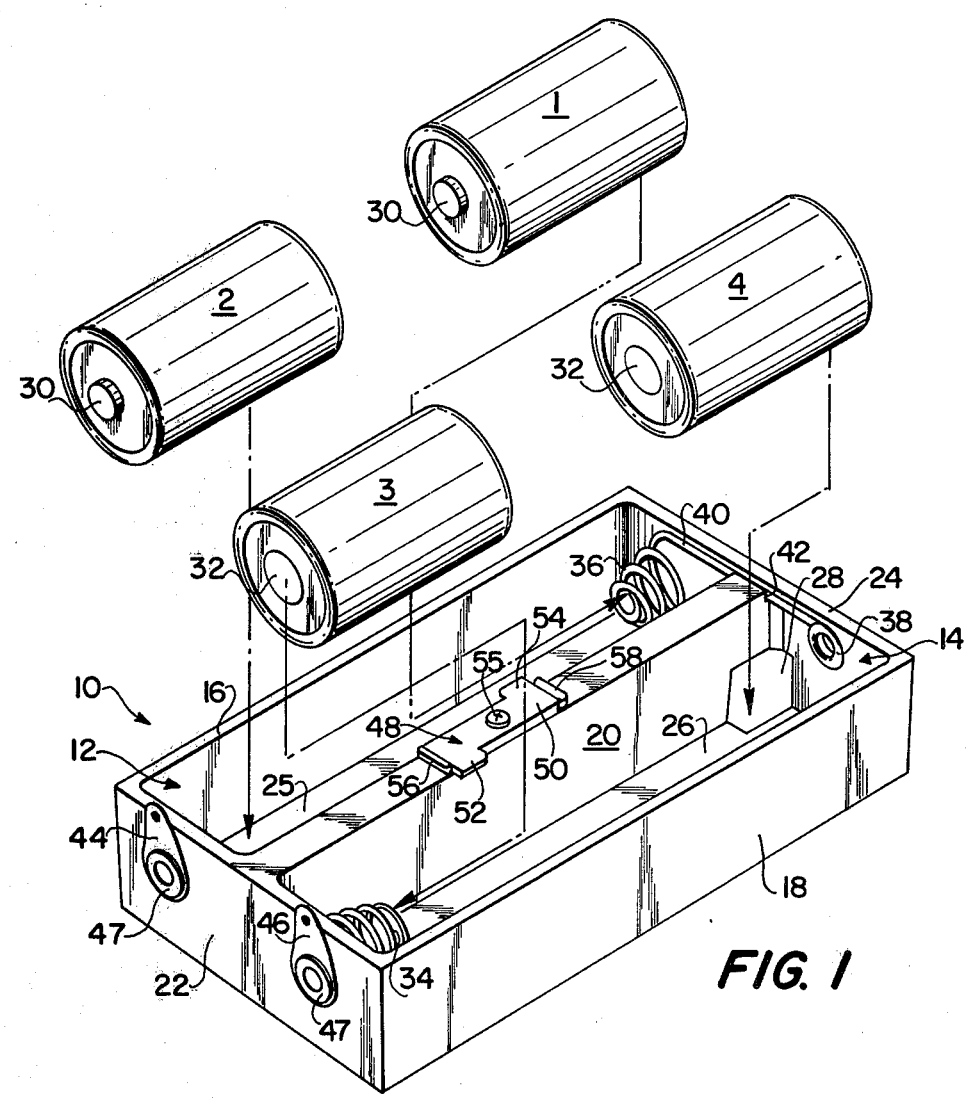
FIG. 1 is a perspective view of a battery holder in accordance with the invention illustrating the manner in which batteries are inserted in the holder.

Referring to the drawings, a battery holder in accordance with the invention comprises, in a preferred form, a tray 10 having a pair of similar, parallel, opentop compartments 12 and 14 of generally rectangular configuration. The compartments have the same orientation and are defined by side walls 16 and 18, a common side wall 20, end walls 22 and 24, and bottom walls 25 and 26. In the form shown, an opening is provided at 28, but this has no bearing upon the present invention. The terms "top", "bottom", "side", and "end" are not intended to restrict the orientation of the battery holder, but are used for ease of description. In practice, the battery holder may be oriented vertically, with wall 22 constituting the "bottom", for example. Indeed, one of the principal uses of the invention is to hold batteries employed in the power supply of a portable magnetic locator, where the orientation of the locator (and hence the battery holder) changes in use.

The battery holder of the invention may be formed of molded plastic, for example. In the exemplary embodiment, it is used to hold four conventional C-size dry cells, designated 1, 2, 3 and 4 in the drawings. As is well known, such dry cells are generally cylindrical and have terminals of opposite polarity at the opposite ends of each battery. The positive terminals 30 are buttons protruding from one end of the dry cells, and the negative terminals 32 may be part of the opposite end of the dry cells.

Inside its end walls each compartment 12 and 14 is provided with appropriate contacts for engaging adjacent battery terminals. At least one contact of each compartment is spring biased. Thus, in the form shown, a coil spring contact 34 is provided at one end of compartment 14 and a coil spring contact 36 is provided at the opposite end of compartment 12. An eyelet contact 38 on end wall 24 may provide the other contact of compartment 14, while a similar eyelet contact (not shown) may provide the other contact of compartment 12. A straight extension 40 of contact spring 36 may pass through a notch 42 at one end of common side wall 20 and be electrically connected to contact 38. Conventional terminals 44 and 46 mounted on end wall 22 by eyelets 47 may be used to support the associated contacts and may be soldered to lead wires (not shown) to connect the batteries in a common circuit.

Figure 2:
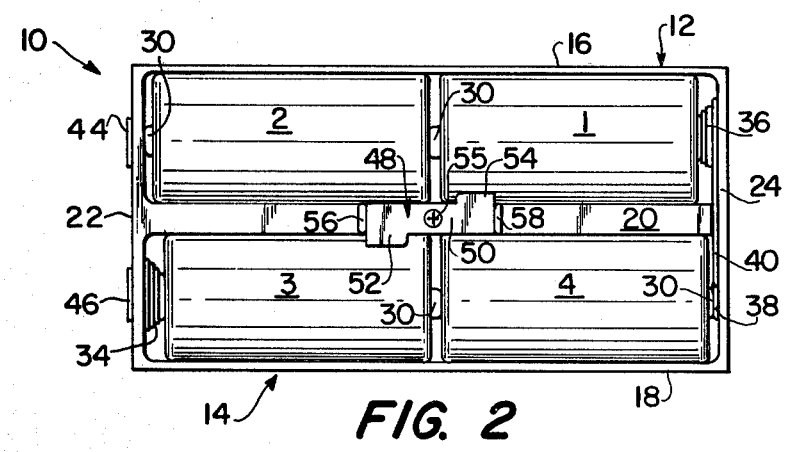
FIG. 2 is a top plan view of the battery holder shown after the batteries have been inserted.

As is apparent in FIG. 2, each compartment 12 and 14 receives a plurality of batteries. In the preferred form, each compartment is dimensioned to receive a pair of batteries in a series between the end walls of the compartment. The spring contacts 34 and 36 ensure that the batteries are urged into engagement with one another and that electrical continuity between the contacts of the batteries is established. With the polarity of the batteries as shown in FIG. 2, a continuous, additive series DC power source is provided between terminals 44 and 46.

The dimensions of the compartments relative to the batteries received therein provide some freedom of movement of the batteries, so that the batteries can move laterally, somewhat, as well as longitudianally against the bias of the spring contacts. In the absence of any additional structure, the column formed by each pair of batteries in a compartment could buckle outwardly through the open top of the compartment in response to forces, such as mechanical shock forces, tending to move the batteries laterally out of the open top of the compartment. If the force were sufficient, the batteries could actually be ejected from the compartment. This condition is, of course, undesirable. Nevertheless, in accordance with the invention it is desired that the batteries be capable of moving somewhat in the compartments in response to mechanical shock forces and, when the batteries are displaced, that they be capable of returning automatically to their original positions. If movement of the batteries in the compartments is permitted, but limited, the desired goals can be achieved, because the bias of the spring contacts tends to hold the batteries in their original positions resiliently.

In accordance with the invention, a retainer 48 is provided which permits the batteries to move somewhat in the direction of the open top of the compartments but limits such movement. In addition, the retainer permits the batteries to be readily inserted in the compartments and readily removed.

The retainer 48 preferably comprises a flat piece that is Z-shaped in the plane of the open top of the compartments and that includes a stem 50 and branches 52 and 54 oppositely directed at the corresponding ends of stem 50, so as to project laterally from the common side wall 20. In the preferred form, retainer 48 is a single piece of plastic secured to common side wall 20 by a single fastener, such as a self-tapping screw 55 extending through stem 50 intermediate its ends and into side wall 20. Pivotal movement of retainer 48 about the axis of fastener 55 is prevented by abutments 56 and 58 integral with side wall 20 and adjacent to opposite ends of stem 50.

In accordance with the preferred form of the invention, it is desired that the batteries be capable of insertion into and removal from the battery holder without requiring that the retainer 48 be removed or otherwise disturbed. As shown in FIG. 1, battery 1 may be inserted into the left end of compartment 12 and then moved longitudinally to engage contact 36. Then battery 2 may be inserted into the left end of compartment 12, partially compressing the spring contact 36. Similarly, battery 3 may be inserted into the right end of compartment 14 and then moved longitudinally into engagement with contact 34, and then battery 4 may be inserted into the right end of compartment 14, partially compressing the spring contact 34.

After the batteries have been inserted, they will appear as shown in FIG. 2. As is apparent, branches 54 and 52 of retainer 48 overlie batteries 1 and 3 sufficiently to prevent these batteries from being removed from their normal positions in the battery holder laterally through the open top of the compartments, while batteries 2 and 4 can be removed from their normal positions through the open top. Slight clearance is provided between branches 54 and 52 and batteries 1 and 3 in their normal positions, respectively, so that batteries 1 and 3 are free to move somewhat toward the open top of the compartments before engaging the associated branches of the retainer 48. The column constituted by each pair of batteries in each compartment 12 and 14 is free to buckle slightly, but not sufficiently for the batteries to fall out of the compartments. There is also sufficient clearance between the batteries and the side walls of the compartments to permit the batteries to move laterally slightly toward and away from the side walls.

Some longitudinal battery movement is possible, since the spring contacts are not fully compressed. Thus, under the influence of mechanical shock forces the batteries may move in the compartments, but automatic restoration of their original positions is permitted under the influence of the spring contacts 34 and 36, so that electrical contact is maintained.

Desired removal of the batteries from the battery holder can be accomplished by removing batteries 2 and 4 from their compartments and then shifting batteries 1 and 3 to the original positions of batteries 2 and 4, at which batteries 1 and 3 can then be removed.

By virtue of the invention, an exceptionally simple and effective battery holder is provided which permits the batteries to move in response to mechanical shock forces and then to return to their original positions automatically without loss of electrical contact, and which at the same time permits easy insertion and removal of the batteries.

In a practical embodiment of the invention, a battery holder for four C-size dry cells has an overall length of 4.325 inches, an overall width of 2.500 inches, and an overall height of 0.875 inch. Each battery compartment is 4.125 inches long, 1.025 inches wide, and 0.800 inch deep (all interior dimensions). The common side wall is 0.300 inch thick. The retainer, mounted centrally on the common side wall, is 0.980 inch long and is 0.430 inch wide at each branched end. Each branch projects 0.130 inch from the stem of the retainer, and the length of each branch along the length of the stem is 0.365 inch. The thickness of the retainer is 0.062 inch. The space between the abutments is 1.000 inch. Each battery is about 1 inch in diameter and about 1 15/16 inches long. The coil spring of each spring contact has an outer diameter of 0.562 inch at the large end and an inner diameter of 0.312 inch at the small end. The free length of each coil spring is ½ inch, and the maximum compressed length is ⅛ inch. Each spring has three active turns between the end turns, which are wound flat.

While a preferred embodiment of the invention has been shown and described, it will be apparent to those skilled in the art that changes can be made in this embodiment without departing from the principles and spirit of the invention, the scope of which is defined in the appended claims.

The invention claimed is:

1. A holder for batteries of the type having terminals of opposite polarity at opposite ends of the battery, said holder comprising a generally rectangular tray having a pair of parallel compartments, each with a bottom wall, a pair of parallel side walls, a pair of parallel end walls, and an open top, one of said side walls separating said compartments and being common to both compartments, each compartment being dimensioned to receive a pair of said batteries in a series between its end walls and having contact means inside its end walls for engaging adjacent battery terminals, the contact means at one end wall of one compartment and the opposite end wall of the other compartment being spring biased to urge the batteries of each compartment into engagement with one another, means interconnecting the contact means at one end of one compartment with the contact means at the same end of the other compartment so that all of said batteries may be connected in a series circuit, each compartment being dimensioned to permit the batteries therein to move somewhat under mechanical shock forces while being held in engagement with one another by the bias of the associated spring biased contact means, and retainer means projecting from said common side wall laterally over one of said batteries in each compartment that engages the spring biased contact means of the compartment, but not over an adjacent battery of that compartment, whereby said one battery in each compartment, but not the adjacent battery in that compartment, is held against removal from its normal position in that compartment through the open top of that compartment, and whereby said one battery in each compartment can be shifted in its compartment to the normal position of the adjacent battery in that compartment for removal from that compartment after the adjacent battery therein has been removed, said retainer means comprising a single piece that is substantially Z-shaped in the plane of the open tops of the compartments and that has a stem centrally mounted on said common side wall and a pair of branches projecting oppositely over said one battery in each of said compartments, respectively.

2. A battery holder in accordance with claim 1, wherein said piece is secured to said common side wall by a single fastener intermediate the ends of said stem and wherein said common side wall has abutments engaging opposite ends of said stem and preventing rotation of said piece on said common side wall.

* * * * *